(12) United States Patent
Tatat et al.

(10) Patent No.: US 8,290,328 B2
(45) Date of Patent: Oct. 16, 2012

(54) CUTTER TOOL AND A METHOD OF MAKING A BRANCH CONNECTION WITH AT LEAST ONE OPTICAL FIBER OF A TELECOMMUNICATIONS CABLE

(75) Inventors: Olivier Tatat, Sangatte (FR); Alain Lavenne, Calais (FR); Jean-Pierre Bonicel, Rueil Malmaison (FR)

(73) Assignee: Draka Comteq B.V. (NL)

( * ) Notice: Subject to any disclaimer, the term of this patent is extended or adjusted under 35 U.S.C. 154(b) by 107 days.

(21) Appl. No.: 13/020,477

(22) Filed: Feb. 3, 2011

(65) Prior Publication Data
US 2011/0197732 A1   Aug. 18, 2011

(30) Foreign Application Priority Data

Feb. 5, 2010   (FR) ...................................... 10 50826

(51) Int. Cl.
*G02B 6/10*   (2006.01)
*B26D 1/48*   (2006.01)
*A61B 17/24*  (2006.01)
*B26F 3/00*   (2006.01)

(52) U.S. Cl. ........ 385/134; 385/135; 385/136; 385/137; 83/200.1; 606/113; 225/93; 225/96.5; 225/102; 225/103

(58) Field of Classification Search .......... 385/347–137; 83/200.1; 606/113; 225/93, 96.5, 102–103
See application file for complete search history.

(56) References Cited

U.S. PATENT DOCUMENTS

| 4,154,385 | A | * | 5/1979 | Lewis ........................... 225/96.5 |
| 4,445,632 | A | * | 5/1984 | Margolin et al. .................. 225/2 |
| 4,730,763 | A | * | 3/1988 | Smith ............................. 225/96 |
| 4,852,244 | A | * | 8/1989 | Lukas .......................... 29/566.3 |
| 5,827,310 | A | | 10/1998 | Marin et al. |
| 5,893,859 | A | | 4/1999 | Marin et al. |
| 6,134,363 | A | | 10/2000 | Hinson et al. |
| 2003/0135222 | A1 | * | 7/2003 | Baska ........................... 606/113 |
| 2005/0209624 | A1 | | 9/2005 | Vijay |

FOREIGN PATENT DOCUMENTS

| EP | 1 052 533 A1 | 11/2000 |
| FR | A 2 665 266 A1 | 1/1992 |
| FR | A 2 706 218 A1 | 12/1994 |
| WO | WO 98/30156 A1 | 7/1998 |
| WO | WO 01/60265 A1 | 8/2001 |
| WO | WO 2008/008115 A2 | 1/2008 |

OTHER PUBLICATIONS

French Search Report issued in Application No. 1050826; Dated Apr. 22, 2010 (With Translation).

* cited by examiner

*Primary Examiner* — Brian M. Healy
*Assistant Examiner* — Guy Anderson
(74) *Attorney, Agent, or Firm* — Shumaker, Loop & Kendrick, LLP

(57) ABSTRACT

A cutter tool for cutting at least one optical fiber arranged freely in a cavity of a telecommunications cable, the tool including a cutting element and a tube, the cutting element being adapted to form a snare around at least one optical fiber to be cut, the snare providing two strands of filament adapted to be introduced in the tube, and the tool enabling an optical fiber branch connection to be made over a long distance through an existing tapping window.

14 Claims, 2 Drawing Sheets

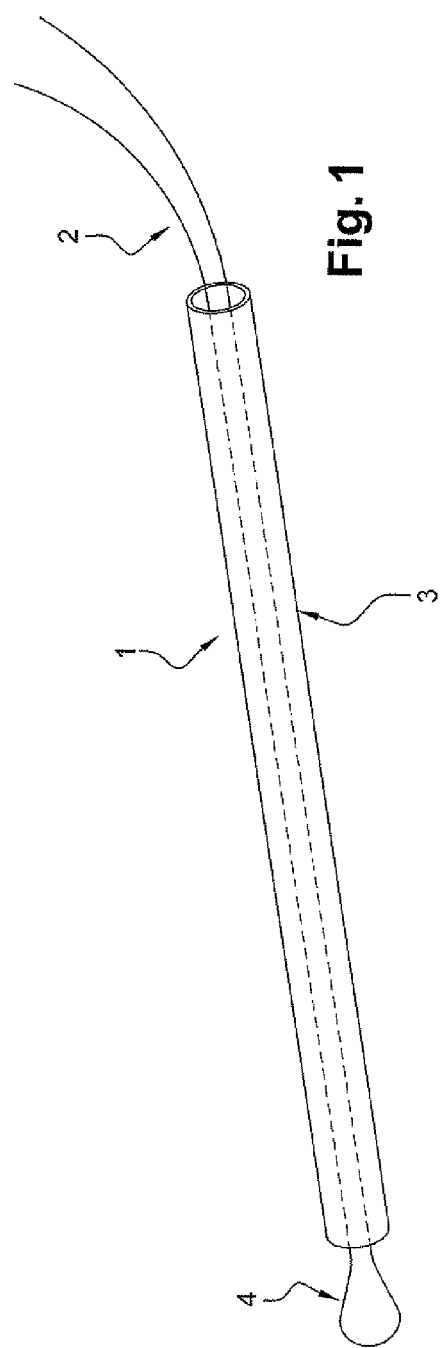
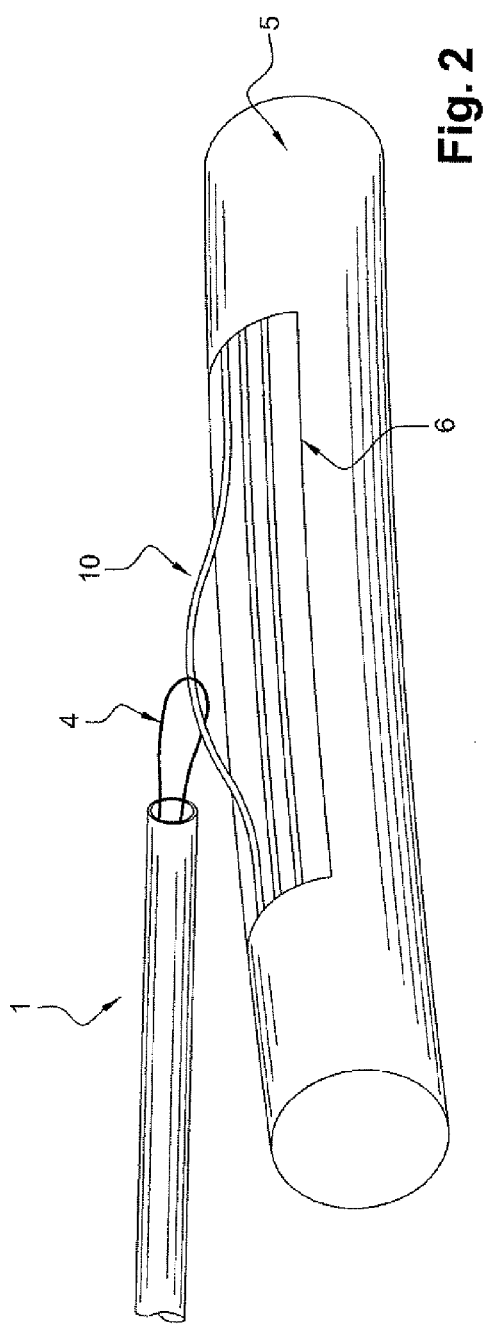

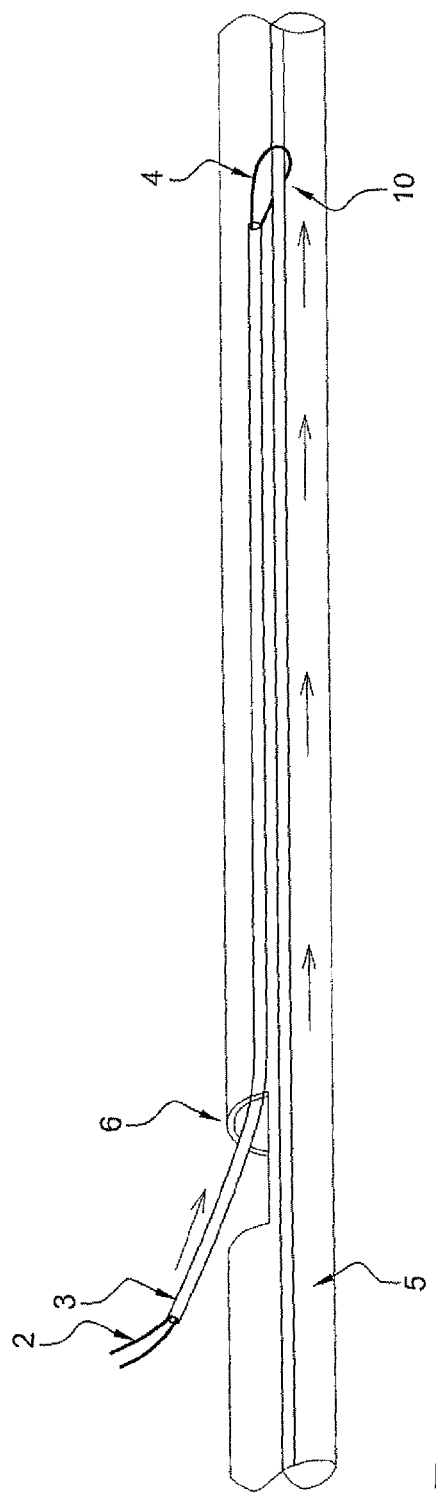
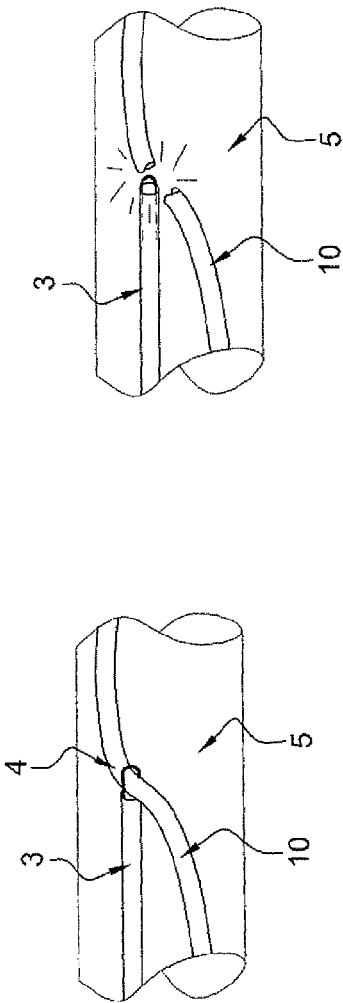

CUTTER TOOL AND A METHOD OF MAKING A BRANCH CONNECTION WITH AT LEAST ONE OPTICAL FIBER OF A TELECOMMUNICATIONS CABLE

CROSS-REFERENCE TO RELATED APPLICATION

This application claims priority to French Patent Application No. 10 50826 filed Feb. 5, 2010, the contents of which are incorporated by reference herein.

TECHNICAL FIELD AND BACKGROUND OF THE INVENTION

The present invention relates to the field of telecommunications cables having optical fibers.

Optical fiber cables that include a plurality of optical fiber micromodules, each optical fiber micromodule being covered by a supporting sheath surrounding one or more fibers, are already known, in particular from documents FR-A-2 665 266 and FR-A-2 706 218.

In a known manner, a micromodule telecommunications cable has a plurality of optical fibers grouped together in micromodules within a (central) cavity that constitutes a core of the cable. The central cavity is surrounded by a sheath. A micromodule may contain about 1 to 24 fibers that are covered together in a supporting sheath that is flexible and fine to a greater or lesser extent. The supporting sheaths of micromodules and the coatings of optical fibers may be colored, numbered, or encoded so as to make it easier to identify the fibers in the cable, e.g. when performing a connection operation.

With the development of optical fiber telecommunications systems that extend as far as the subscriber, known under the acronyms FTTH for "fiber to the home" or FTTC for "fiber to the curb", it is desirable to provide a large-capacity cable containing a large number of optical fibers that are grouped together in micronodules. Such cables must make it possible to access each micromodule individually in order to serve a given building. For this purpose, operators make a branch connection from the telecommunications cable, an opening is formed in the sheath of the cable and one or more fibers are extracted in order to deliver signals to a given optical system.

Document EP-A-1 052 533 describes a method of accessing one or more optical fibers in a cable in order to make a fiber branch connection to an optical system. Two cuts are formed in the sheath of the cable in order to create a first opening through which the fiber is cut and a second opening through which the cut fiber is pulled out in order to make a branch connection.

Document U.S. Pat. No. 6,134,363 describes a method of accessing one or more optical fibers arranged freely in a cable. The sheath of the cable is removed on either side of peripheral reinforcing elements over a certain length in order to create a window that gives access to the fibers.

WO 01/60265 (A1) recites a surgical snare including an elongate barrel having a distal end and a proximal end. A handle having holes which can accommodate the fingers of a surgeon, is connected to the proximal end of the barrel. The handle is connected to a rod that extends along a central bore of the elongate barrel. The handle can slide along a slot formed in a proximal end portion of the snare. Moving the handle towards the proximal end of the snare causes a loop of wire to be retracted into the central bore of the elongate barrel. The distal end of the snare consists of a flattened, widened portion which has two cutting edges. The cutting edges can be used in conjunction with the loop of wire to assist in dissection of tissue. The snare may also include a vacuum port for removing smoke and blood from the site of the operation. The snare can be an electrosurgery snare.

The above surgical snare is however not suited for cutting an optical fibre, especially one such fibre arranged freely in a telecommunication cable. Further, the surgical snare is not formed around an object.

WO 98/30156 (A1) recites a graft being inserted into a passageway such as a patient's artery. After the distal end of the graft is tacked to the passageway, a special intraluminal cutting device is threaded along the graft and actuated at the appropriate position so that the graft can be cut to the proper size.

The above graft is however not suited for cutting an optical fibre, especially one such fibre arranged freely in a telecommunication cable. Further, the surgical snare is not formed around an object.

US 2005/209624 (A1) recites a surgical scissors includes two cutting blades operable via a handle. One of the blades is provided with a distally projecting needle-like tip which can easily pierce tissue. In use, the tip on the blade is gently pressed against a vessel, preferably at a shallow angle relative to the vessel, to define an entry hole. This shallow angle approach with the needle-like piercing tip reduces the opportunity for inadvertent puncture. The lower blade is then pushed further through the entry hole in alignment with the piercing tip such that the cutting blade portion of the lower blade also enters the vessel. The handle is then operated to cause the blades cut the vessel tissue there between to create the incision. The instrument facilitates making lengthwise incisions in vessels by eliminating offline cutting, and substantially reducing the likelihood of cutting the posterior vessel wall.

The above scissors are however not suited for cutting an optical fibre, especially one such fibre arranged freely in a telecommunication cable. Further, the scissors are not adapted to form a snare around an object.

WO 2008/008115 (A2) recites fiber optic distribution cables and methods for manufacturing the same are disclosed. The fiber optic distribution cables present one or more optical fibers outward of the protective covering for distribution of the same toward the subscriber. In one fiber optic distribution cable, a length of distribution optical fiber that is removed from the distribution cable and presented outward of the protective covering is longer than the opening at access location. In another embodiment, a demarcation point is provided for inhibiting the movement (i.e., pistoning) of the distribution optical fiber into and out of the distribution cable. In still another embodiment, an indexing tube is provided for indexing a tether tube within the indexing tube for providing the distribution optical fiber with a suitable excess fiber length. Additionally, other embodiments may include a fiber optic distribution cable having a dry construction and/or a non-round cross-section.

The cutting tool recited in the above document does not comprise a tube.

With the development of FTTH or FTTC, telecommunications operators are faced with a large increase in the number of connection operations that need to be performed on a given cable and at a given branch connection point. Thus, by way of example, after making an access window in order to connect a first subscriber, the operator may need over time to open that window again in order to extract another fiber so as to connect a new subscriber.

The methods and the tools described in some of the above-mentioned documents provide for opening two access windows, a first window for cutting one or more fibers, and a second window for pulling out the fiber(s) for making the branch connection. During a connection operation, it would be desirable to open only one window.

Document WO-A-2008/008115 proposes a method of distributing fibers from a cable by providing an installation that includes a tether for the excess length of extracted fiber. That document also describes a tool that can be used for cutting one or more fibers in the cable. The tool provides a tongue having an opening at one of its ends for passing a sharp filament that forms a snare around the fiber(s) for cutting. The tongue, with the snare, is inserted into the cable through an opening in the sheath and is slid along inside the cavity of the cable to the cutting point. The sectioned fiber(s) is then pulled out through the opening and arranged in the tether.

The tool described in that document allows only a relatively short length of fiber (175 millimeters (mm)) to be extracted for connection to the tether positioned on the sheath of the cable. A secondary cable must then be provided for connecting the extracted fiber to a subscriber optical unit. Furthermore, the sharp filament of the tool described in that document is merely guided by the tongue, without being protected; it might catch and damage fibers and/or other elements of the cable, in particular when the packing ratio of the cable is high.

There thus exists a need for a method of making a branch connection and for a tool that enables fibers to be sectioned at a considerable distance from a single opening, but without running the risk of damaging elements of the cable.

BRIEF SUMMARY OF THE INVENTION

To this end, the present invention proposes a tool comprising a sharp filament forming a snare with two strands thereof being inserted in a tube. The tube serves to guide the sharp filament inside the cavity of the cable while also protecting elements of the cable. The invention provides a method of making a branch connection using such a tool. The tool and the method of the invention make it possible in particular to reuse a given tapping window over time.

More particularly, the present invention provides a cutter tool for cutting at least one optical fiber arranged freely in a cavity of a telecommunications cable, the tool comprising a cutting element and a tube, the cutting element being adapted to form a snare around at least one optical fiber to be cut, the snare providing two strands of filament adapted to be introduced in the tube. In a typical example the strands represent ends of the filament.

In embodiments, the tool of the invention may further include one or more of the following characteristics:
the tube provides a length lying in a range of 1 meter (m) to 8 m;
the tube provides an inside diameter lying in a range of 0.8 mm to 2.5 mm;
the tube provides a wall thickness of less than 0.5 mm;
the tube is made of a material selected from: stainless steel; a ferrous alloy; a non-ferrous alloy and a plastics material; and
the cutting element is made of a material selected from: copper; brass; stainless steel; steel; nylon; Twaron; aramid; Dyneema and Kevlar.

The invention also provides a method of making a branch connection with at least one optical fiber of a telecommunications cable, the cable comprising a plurality of optical fibers arranged freely in a cavity that is surrounded by a sheath, the method comprising the steps:
forming an opening in the sheath of the cable;
forming a snare with a sharp filament around at least one optical fiber to be cut, said sharp filament providing a loop forming the snare and two filament strands providing ends;
inserting the strands of filament into a tube, one end of the tube having the snare projecting therefrom and the other end of the tube having the free ends of the sharp filament projecting therefrom;
inserting the tube into the cavity of the cable through an opening formed in the sheath of the cable;
causing the snare to slide along said at least one optical fiber to be cut;
pulling on the free ends of the sharp filament so as to section said at least one optical fiber; and
making a branch connection with said at least one sectioned optical fiber.

In applications of the method of the invention, it may further include one or more of the following characteristics:
the opening formed in the sheath of the cable is a tapping window;
the opening formed in the sheath of the cable is a tapping window that has previously been used for making a branch connection with at least one other optical fiber;
the tube is inserted in the cable cavity over a distance of 1 m to 5 m for a cable providing a packing ratio of less than 70%;
the tube is inserted in the cable cavity over a distance of 1 m to 8 m for a cable providing a packing ratio of less than 50%;
the tube is inserted in the cable cavity over a distance of 0.5 m to 1 m for a cable providing a packing ratio lying in the range 70% to 75%;
the tube is inserted in a curved portion of the cable having a radius of curvature greater than 0.35 m; and
the snare is formed around an optical fiber micromodule.

BRIEF DESCRIPTION OF THE FIGURES

Other characteristics and advantages of the invention appear on reading the following description of embodiments of the invention, given by way of example and with reference to the accompanying figures, in which:
FIG. 1 is a diagram of a tool of the invention;
FIG. 2 is a diagram of a telecommunications cable and of a tool of the invention showing a first step in the branch connection method of the invention;
FIG. 3 is a diagram of a cable and of a tool showing a second step in the branch connection method of the invention; and
FIGS. 4a and 4b are detail views showing a third step of the branch connection method of the invention.

DETAILED DESCRIPTION OF THE INVENTION

The invention is described below with reference to examples that are illustrative and non-limiting. The examples shown are given with reference to a micromodule cable; however it should be understood that the invention can be implemented with any type of cable having freely-placed optical fibers, providing the packing ratio of the cable allows the tool to be inserted. Optical fibers that are "freely-placed" should be understood as being optical fibers that are not stranded (i.e. that are not wound together helically or in an alternating SZ pitch). The term "packing ratio" is used to designate the ratio of the volume of the cavity of the cable divided by the volume actually occupied by optical fibers. Thus, although the description below makes reference to a micromodule cable, the invention can be implemented with a cable having fibers that are doubly sheathed or fibers that are bare, for example.

FIG. 1 shows a cutter tool of the invention. The cutter tool is designed to section at least one optical fiber in a telecommunications cable. The tool 1 comprises a tube 3 and a cutting element 2 made up of a sharp filament 2 forming a snare. The tube 3 is adapted to receive the sharp filament 2 passing through it twice. One end of the tube 3 thus has a snare 4 projecting therefrom and the other end of the tube has the free ends of two strands of the filament 2 projecting therefrom.

The sharp filament 2 is fine, strong, and flexible; it provides a diameter that may lie in the range 0.3 mm to 0.8 mm. The sharp filament is made of a material that is strong enough to provide a cutting action; it may be made of steel, copper, brass, stainless steel; it may also be made of a plastics material such as nylon, or some other material such as Kevlar, Twaron, aramid, Dyneema, etc. The sharp filament 2 provides an elastic limit that is sufficient to ensure that it can cut at least one optical fiber. The term "elastic limit" is used to designate the tension beyond which deformation of the material passes from deformation that is elastic to deformation that is permanent.

The tube 3 provides a length lying in the range 1 m to 8 m depending on the intended application. The tube 3 is fine, relatively rigid, and sufficiently flexible to enable it to be inserted into the cavity of a telecommunications cable over several meters, as described below. The tube 3 provides an inside diameter lying in the range 0.8 mm to 2.5 mm, and a wall thickness of less than 0.5 mm. The wall of the tube 3 need not be cylindrical; the tube of the tool of the invention serves to pass and to guide two strands of the sharp filament 2.

The tube 3 may be made of stainless steel, of a ferrous alloy, a non-ferrous alloy such as copper brass, or indeed out of a plastics material such as polybutylene terephthalate (PBT), polypropylene (PP), or polyethylene (PE), for example. Such materials confer flexibility, rigidity, and strength to the tube; the tube can thus be inserted into the cavity of the cable over a long distance without buckling and without damaging for the elements of the cable, even when the cable provides a bend. Under such circumstances, a tube should be selected that is of small diameter and flexible.

The tool 1 of FIG. 1 is for sectioning at least one optical fiber of a cable in order to make a branch connection to a secondary cable, e.g. for connecting a subscriber to a telecommunications network.

FIG. 2 shows a micromodule telecommunications cable together with the tool of FIG. 1.

In a known manner, a micromodule telecommunications cable 5 provides a longitudinal central cavity defining the cavity of the cable and containing micromodules 10 that are substantially parallel to one another, each grouping together optical fibers that are substantially parallel to one another. Optical fibers that are said to be "parallel" to one another should be understood as optical fibers that are freely-placed. A sheath surrounds the cavity of the cable; the sheath may be made of polymer, e.g. of high density polyethylene; it provides a good transverse barrier to moisture, and it provides a certain amount of mechanical flexibility. The sheath of the cable may contain reinforcing elements that are placed longitudinally. The cavity of the cable may also contain reinforcing elements and/or sealing elements placed between the micromodules.

In order to make a branch connection in such a telecommunications cable, it is necessary to make at least one opening 6 through the sheath of the cable and to section one or more micromodules 10 that are subsequently pulled out to an optical system junction box. Such an opening in the cable is often referred to as a tapping window. A tapping window typically provides an opening with a side of a few centimeters; the person skilled in the art knows how to make such openings in the sheath of a telecommunications cable.

The branch connection method of the invention proposes using a tool as described with reference to FIG. 1 for sectioning at least one optical fiber by passing through a tapping window. The same opening, i.e. the tapping window, is used for sectioning the optical fibers that are to form the branch connection and also for extracting them. With a micromodule cable, it may be necessary to section the entire micromodule in order to section the fiber(s) it contains.

The snare 4 of sharp filament is formed around a micromodule 10 containing the fiber(s) for forming the branch connection, and the two strands of the sharp filament are inserted into the tube 3 as shown in FIG. 2. One end of the tube 3 has the snare 4 projecting therefrom and its other end has the free ends of the sharp filament 2 projecting therefrom. The tube can then be slid along the cavity of the cable through the opening 6 of the tapping window, as shown in FIG. 3. The snare 4 slides inside the cavity of the cable along the selected micromodule 10 while the free ends of the strands of the sharp filament 2 continue to project from the tube 3 outside the opening 6. The snare 4 is matched to the size of the micromodule 10 that is to be sectioned, i.e. it is both sufficiently tight to avoid damaging elements of the cable and to allow it to be properly guided, and also sufficiently loose to avoid damaging the selected micromodule until the cutting point is reached. The cutting point is determined as a function of the length of the fiber that is needed for making the branch connection to the junction point with the optical system that is to be connected.

FIGS. 4a and 4b show the micromodule 10 being cut with the tool of the invention. When the cutting point is reached, i.e. when the distance between the tapping window and the point reached by the snare is sufficient to enable the intended branch connection to be made, the free ends of the sharp filament 2 are pulled backwards by an operator. The term "pulling backwards" is used to designate applying traction to the ends of the sharp filament in a direction opposite to the direction in which the tube penetrates into the cavity of the cable. The traction on the ends of the sharp filament projecting from the end of the tube causes the snare 4 to tighten on the micromodule 10 that it surrounds, and then to section it. Cutting may be performed by the sharp filament 2 itself, or by pressing the micromodule against the end of the tube when the filament is pulled. The tube 3 is then withdrawn from the cavity of the cable and the sectioned micromodule is pulled so as to be extracted from the cavity of the cable and so as to be taken as a branch connection to a junction point with an optical system that is to be connected.

In applications of the FTTH or FTTC type, the distance needed for the various connection operations is often longer than 1 m and may be as much as 8 m depending on the method selected. Depending on the application, it is possible to perform a local splice on the sectioned fibers or to take the sectioned fibers to a subscriber unit.

The tool of the invention is both sufficiently fine and flexible and also sufficiently strong to be capable of penetrating into the cavity of the cable over such a distance. In particular, since the strands of the sharp filament are placed inside the tube, they may be guided accurately over a long distance without the sharp filament damaging elements of the cable. If the sharp filament were merely to be pulled over such a distance by a tongue as in the tool of above-mentioned document WO-A-2008/008115, it might catch on the sheaths of the micromodules or on the reinforcing elements or on the sealing elements and it might damage them severely, in particular while the strands of the filament are being pulled in order to close the snare.

Thus, the branch connection method using a tool of the invention enables the tube to be inserted over a distance that may be as much as 5 m when the packing ratio of the cable is less than 70%, or over a distance that may be as much as 8 m when the packing ratio of the cable is less than 50%, or indeed over a distance of 0.5 m to 1 m when the packing ratio of the cable lies in the range 70% to 75%. The tool of the invention may be used for any type of cable providing the packing ratio enables the tube to be inserted into the cavity of the cable, e.g. any cable having a packing ratio of less than 90%.

When the length of fiber taken by means of the tool of the invention is sufficient to enable it to be taken to a subscriber unit, it is possible to avoid performing a splicing operation, thus providing a saving in time for the operator and smaller optical losses for the subscriber.

Furthermore, the branch connection of the invention makes it possible to form only one opening in the sheath of the cable instead of two openings as described in above-mentioned document EP-A-1 052 533. With the tool of the invention there is no need to form a first opening for sectioning a micromodule and a second opening for extracting the sectioned micromodule, since the tool of the invention makes it possible to make a cut at a distance from the tapping window.

Furthermore, a single tapping window may be used several times over in order to connect different subscribers by making branch connections from different micromodules in succession, even if the branch connection distance varies from one connection to another. On the first occasion, a tapping window is formed using any known method, and then the window is than closed, e.g. by means of a leak-tight coupling sleeve, and it can easily be reopened. During subsequent actions throughout the lifetime of the cable, which may be as much as 25 years or more, the same tapping window can be used again.

The ability to be able to reuse a tapping window for a plurality of connections enables a significant saving to be achieved both in time and in cost for the telecommunications operator. This potential for reusing an existing tapping window is made possible by the tool of the invention since it makes it possible to section a micromodule at a distance from the tapping window.

The tool of the invention may also be used on cables that are wound or coiled-down with a radius of curvature that is greater than 0.35 m. The term "radius of curvature" relates to an inside radius of a curved portion of cable. Cables installed in built-up areas are often wound or coiled-down in access chambers. The tube of the tool is sufficiently flexible to enable it to be inserted into the cavity of the cable over the desired distance without it being necessary for the operator to straighten out a portion of the cable. In other words, the present tool can be used in bent cables, having the above radius of curvature, which is an advantage, as such bent cables are typically not easy accessible. When the curvature becomes to high it becomes difficult to introduce the present tool in the cable, if not impossible.

Depending in the type of cable, the operator may select to use a tube of greater or smaller diameter in combination with a sharp filament of greater or smaller diameter. For example, the operator may have a plurality of tubes of different diameters: 0.8 mm, 1.0 mm, 1.2 mm, . . . , 2.5 mm, i.e. from 0.8 mm-2.5 mm, having wall thicknesses that are different: 0.2 mm, 0.3 mm, . . . , 0.5 mm, i.e. from 0.2 mm-0.5 mm, and also a plurality of filaments of different diameters: 0.3 mm, 0.5 mm, . . . , 0.8 mm, i.e. from 0.3 mm-0.8 mm, and to select the tube and the filament that are the most appropriate for the action that is to be taken.

The tool and the method of the invention thus enable subscribers to be connected to a telecommunications network quickly and at low cost.

Naturally, the present invention is not limited to the embodiments described by way of example; in particular, the materials and the dimensions of the tube and of the sharp filament of the tool may vary as a function of applications, and in particular as a function of cable type (micromodule cable, cable having doubly sheathed fibers, cable having bare fibers).

What is claimed is:

1. A cutter tool for cutting at least one optical fiber arranged freely in a cavity of a telecommunications cable, the tool comprising a cutting element and a tube, the cutting element being adapted to form a snare around at least one optical fiber to be cut, the snare providing two strands of filament adapted to be introduced in the tube.

2. The cutter tool according to claim 1, wherein the tube provides a length lying in a range of about 1 m to about 8 m.

3. The cutter tool according to claim 1, wherein the tube has an inside diameter ranging from about 0.8 mm to about 2.5 mm.

4. The cutter tool according to claim 1, wherein the tube has a wall thickness less than about 0.5 mm.

5. The cutter tool according to claim 1, wherein the tube is made from at least one of stainless steel, a ferrous alloy, a non-ferrous alloy and a plastic material.

6. The cutter tool according to claim 1, wherein the cutting element is made from at least one of copper, brass, stainless steel, steel, nylon, kevlar, twaron, aramid, and dyneema.

7. A method of making a branch connection with at least one optical fiber of a telecommunications cable, the cable comprising a plurality of optical fibers arranged freely in a cavity that is surrounded by a sheath, the method comprising the steps of:
   forming an opening in a sheath of a cable;
   forming a snare with a sharp filament around at least one optical fiber to be cut, the sharp filament providing a loop forming the snare and two filament strands providing free ends;
   inserting the strands of filament into a tube, one end of the tube having the snare projecting therefrom and the other end of the tube having the free ends of the sharp filament projecting therefrom;
   inserting the tube into the cavity of the cable through an opening formed in the sheath of the cable;
   causing the snare to slide along the at least one optical fiber to be cut;
   pulling on the free ends of the sharp filament so as to section the at least one optical fiber; and
   making a branch connection with the at least one sectioned optical fiber.

8. The method of claim 7, wherein the opening formed in the sheath of the cable is a tapping window.

9. The method of claim 7, wherein the opening formed in the sheath of the cable is a tapping window that has previously been used for making a branch connection with at least one other optical fiber.

10. The method of claim 7, wherein the tube is inserted in the cable cavity over a distance of about 1 m to about 5 m for a cable providing a packing ratio of less than about 70%.

11. The method of claim 7, wherein the tube is inserted in the cable cavity over a distance of about 1 m to about 8 m for a cable providing a packing ratio of less than about 50%.

12. The method of claim 7, wherein the tube is inserted in the cable cavity over a distance of about 0.5 m to about 1 m for a cable providing a packing ratio ranging from about 70% to about 75%.

13. The method of claim 7, wherein the tube is inserted in a curved portion of the cable having a radius of curvature greater than about 0.35 m.

14. The method of claim 7, wherein the snare is formed around an optical fiber micromodule.

* * * * *